(12) United States Patent
Ishishita

(10) Patent No.: US 7,336,055 B2
(45) Date of Patent: Feb. 26, 2008

(54) METHOD FOR DETECTING ABNORMALITY OF TEMPERATURE SENSORS, AND POWER SUPPLY APPARATUS

(75) Inventor: Teruo Ishishita, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 305 days.

(21) Appl. No.: 11/128,157

(22) Filed: May 13, 2005

(65) Prior Publication Data
US 2005/0275383 A1  Dec. 15, 2005

(30) Foreign Application Priority Data
Jun. 15, 2004 (JP) ............... 2004-176961

(51) Int. Cl.
H02J 7/04 (2006.01)
H04J 7/16 (2006.01)

(52) U.S. Cl. ............ 320/150; 320/134; 320/136; 320/153; 361/103; 361/106

(58) Field of Classification Search ............. 320/150, 320/134, 136, 153; 361/103, 106; 374/170; 327/512, 513
See application file for complete search history.

(56) References Cited

U.S. PATENT DOCUMENTS 4,058,975 A    11/1977  Gilbert et al.
5,663,899 A *   9/1997  Zvonar et al. ............... 702/130
6,903,534 B2 *  6/2005  Minamiura .................. 320/150
2002/0048309 A1 *  4/2002  Blankenagel ................ 374/141
2004/0097915 A1 *  5/2004  Refior et al. .................. 606/34

FOREIGN PATENT DOCUMENTS

| EP | A 1500915 A1 | 1/2005 |
| FR | A 2334827 | 7/1977 |
| JP | A 11-122840 | 4/1999 |
| JP | A 2000-065906 | 3/2000 |
| JP | A 2003-151643 | 5/2003 |

* cited by examiner

Primary Examiner—Bao Q. Vu
Assistant Examiner—Jue Zhang
(74) Attorney, Agent, or Firm—Oliff & Berridge, PLC

(57) ABSTRACT

A power supply apparatus includes an assembled battery including a plurality of cells, a plurality of temperature sensors sensing temperatures of the plurality of cells, respectively, a current sensor sensing a current flowing through the assembled battery, and a state monitoring unit and an abnormality detecting apparatus that are a detecting unit of detecting an abnormality of the plurality of temperature sensors. The detecting unit makes a notification of an abnormality, when charging or discharging of the assembled battery is performed and on a basis of a plurality of detections of the deviation being greater than a first prescribed value and the output fluctuation range being smaller than a second prescribed value.

6 Claims, 6 Drawing Sheets

US 7,336,055 B2

METHOD FOR DETECTING ABNORMALITY OF TEMPERATURE SENSORS, AND POWER SUPPLY APPARATUS

This nonprovisional application is based on Japanese Patent Application No. 2004-176961 filed with the Japan Patent Office on Jun. 15, 2004, the entire contents of which are hereby incorporated by reference.

BACKGROUND OF THE INVENTION

1. Field of the Invention

The present invention relates to a method for detecting an abnormality of temperature sensors with which an abnormality of the battery temperature sensors can be detected accurately, and to a power supply apparatus.

2. Description of the Background Art

Vehicles such as electric vehicles or hybrid vehicles that obtain the vehicle-drive power from a motor are equipped with a battery, that is, a secondary battery. The electric vehicles use the electric power stored in the secondary battery for rotating the motor so that the vehicles can travel. There are hybrid vehicles that use the electric power stored in the secondary battery for rotating the motor so that the vehicles can travel, and hybrid vehicles that use the engine as well as the motor so that the vehicles can travel.

The secondary battery mounted on the hybrid vehicle is a battery including an assembled battery in which a plurality of cells are arranged as a group. To the assembled battery, charging control has been provided by detecting SOC (State Of Charge) based on the voltage and current. Japanese Patent Laying-Open No. 2003-151643 discloses a technology for determining such a state of an assembled battery based on a current flowing through the assembled battery, voltages of a plurality of cells, and temperatures.

As above, among the hybrid vehicles, some employ the scheme for driving the wheels using both the drive power from the motor and the drive power from the engine. In this scheme, the charging/discharging amount that can be supplied to/from the battery is determined in accordance with the voltage, current and temperature of the battery. Based on the charging/discharging amount that can be supplied to/from the battery, the drive power sharing between the motor and the engine is controlled.

However, if measurement of the battery temperature is not accurately performed, there may be a case where control is provided in a state where the drive power share of the engine being greater than in the ideal drive power sharing. In such a state, the concentration of undesirable components such as nitrogen oxide is higher than in the ideal exhaust.

Such components are purified by the action of a catalyst provided in the exhaust path when the vehicle is normally traveling. However, in order for the catalyst to exert its effect of purifying the exhaust gas, the catalyst must be fully warmed. Therefore, the concentration tends to increase just after the start up of the engine, where the catalyst is not pre-heated.

Accordingly, in order to provide control of the hybrid vehicle with the ideal drive power sharing, it is desirable that an abnormality occurring with a temperature sensor is accurately detected so that the temperature sensor is repaired.

Conventionally, when monitoring the battery with a plurality of temperature sensors, a temperature sensor has been assumed to be abnormal when the temperature sensor indicates the measured temperature significantly different from those of the other temperature sensors.

On the other hand, when providing a temperature sensor for each of a plurality of cells included in the assembled battery, the temperature variation among the plurality of cells differs depending on the arrangement of the cells for each vehicle type, the performance of the cooling fan or the like. In addition, there may be a case where the temperature is actually different among the temperature sensors. Accordingly, it has been difficult to accurately detect an abnormality of the temperature sensors.

SUMMARY OF THE INVENTION

An object of the present invention is to provide a method for detecting an abnormality of temperature sensors with which an abnormality of a plurality of temperature sensors used for a battery can be accurately detected, and a power supply apparatus using the same.

In summary, the present invention is a method for detecting an abnormality of a plurality of temperature sensors provided to an assembled battery including a plurality of cells. The method includes: a first step of determining whether or not charging or discharging of the assembled battery is performed; a second step of determining a deviation of output values of the plurality of temperature sensors at a determination time point; and a third step of determining an output fluctuation range for each of the plurality of temperature sensors in a prescribed determination period.

Preferably, the first step includes: a step of periodically measuring a current flowing through the assembled battery and determining sum of squares of measured values; a step of dividing the sum of squares of measured values by number of measurement times to determine a mean square of current value; and a step of determining whether or not charging or discharging of the assembled battery is performed using the mean square of current value.

Preferably, the method further includes a step of making a notification of an abnormality, when charging or discharging of the assembled battery is performed and on a basis of a plurality of detections of the deviation being greater than a first value and the output fluctuation range being smaller than a second value.

According to another aspect of the present invention, a power supply apparatus includes: an assembled battery including a plurality of cells; a plurality of temperature sensors sensing temperatures of the plurality of cells, respectively; a current sensor sensing a current flowing through the assembled battery; and a detecting unit detecting an abnormality of the plurality of temperature sensors. The detecting unit detects the abnormality of the plurality of temperature sensors based on a first determination result of determining whether or not charging or discharging of the assembled battery is performed, a second determination result of determining a deviation of output values of the plurality of temperature sensors at a determination time point, and a third determination result of determining an output fluctuation range for each of the plurality of temperature sensors in a prescribed determination period.

Preferably, the detecting unit periodically measures a current flowing through the assembled battery, determines sum of squares of measured values, divides the sum of squares of measured values by number of measurement times to determine a mean square of current value, and determines whether or not charging or discharging of the assembled battery is performed using the mean square of current value.

Preferably, the detecting unit makes a notification of an abnormality, when charging or discharging of the assembled battery is performed and on a basis of a plurality of detections of the deviation being greater than a first value and the output fluctuation range being smaller than a second value.

Accordingly, the main advantage of the present invention is that fixing abnormality of the output values of temperature sensors can be accurately detected, when a plurality of temperature sensors are used for monitoring a battery.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
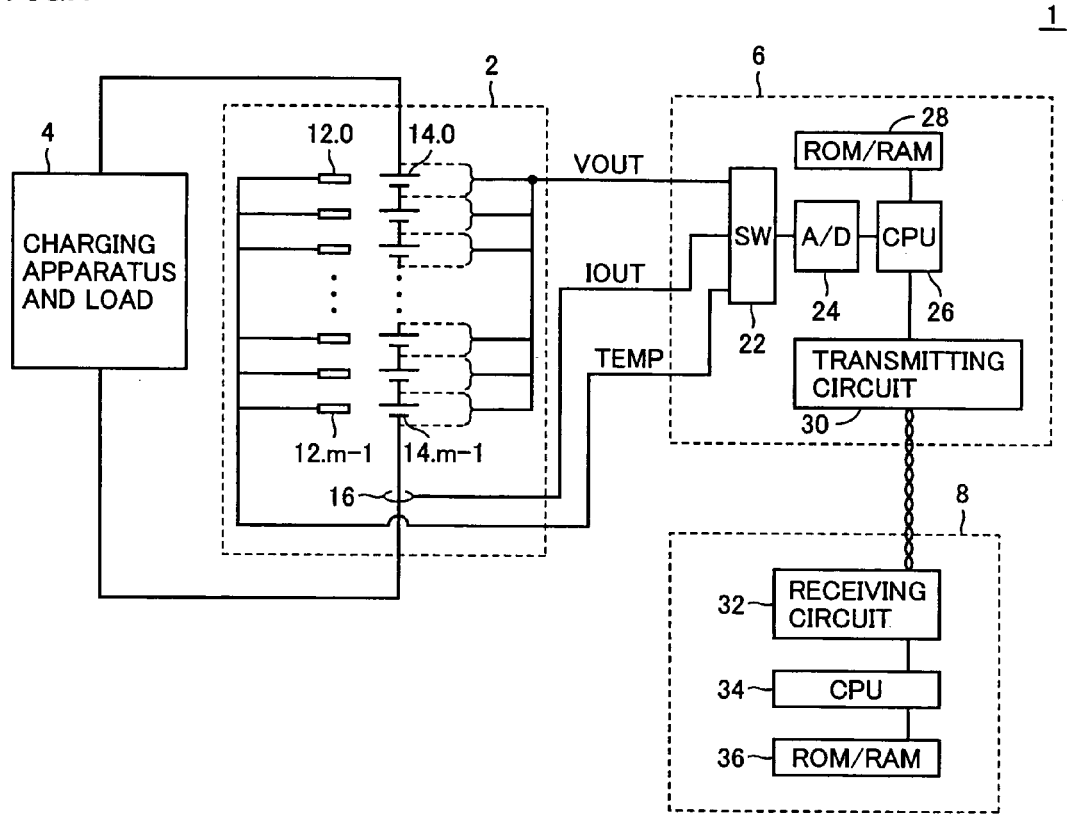
FIG. 1 is a block diagram showing a configuration of a power supply apparatus 1 of the present invention.

In the following, referring to the drawings, an embodiment of the present invention will be described in detail. Throughout the drawings, identical or corresponding parts are given the same reference character, and description thereof will not be repeated.

FIG. 1 is a block diagram showing a configuration of a power supply apparatus 1 of the present invention.

Referring to FIG. 1, power supply apparatus 1 includes a battery 2, a state monitoring unit 6 receiving from battery 2 a signal VOUT indicative of a voltage, a signal IOUT indicative of a current, and a signal TEMP indicative of a temperature to monitor the state of battery 2, and an abnormality detecting apparatus 8 obtaining sensor information from state monitoring unit 6 by communication.

To battery 2, a charging apparatus and a load 4 are connected. For example, when power supply apparatus 1 is a power supply for a hybrid vehicle, an inverter or the like for driving the motor for providing the drive power corresponds to the load, and a generator or the like generating the electric power by the revolution of the engine for charging the battery corresponds to the charging apparatus.

Battery 2 includes an assembled battery formed of m of serially connected battery cells 14.0-14.m−1, a current sensor 16 detecting a current flowing through battery cells 14.0-14.m−1, and temperature sensors 12.0-12.m−1 correspondingly provided to battery cells 14.0-14.m−1 for monitoring temperatures of the cells, respectively.

State monitoring unit 6 includes a switch 22 selecting signals VOUT, IOUT, and TEMP, an A/D converter 24 converting the signal selected by switch 22 from an analog value into a digital value, and CPU 26 taking in the digital value output from A/D converter 24. Switching of switch 22 is performed based on the instruction of CPU 26.

State monitoring unit 6 further includes ROM/RAM 28 that is a memory for storing a program executed on CPU 26 and/or to be a temporary workspace, and a transmitting circuit 30 for receiving sensor information such as voltage, current and temperature and for transmitting the same to abnormality detecting apparatus 8.

Signal VOUT includes inter-terminal voltages of respective ones of battery cells 14.0-14.m−1, which are successively selected by switch 22 to be converted into digital signals in a time-divisional manner by A/D converter 24. Thus, CPU 26 can obtain a voltage value for each of the cells.

Signal TEMP includes outputs of temperature sensors 12.0-12.m−1 respectively measuring the temperatures of battery cells 14.0-14.m−1, which are successively selected by switch 22 to be converted into digital signals in a time-divisional manner by A/D converter 24. Thus, CPU 26 can obtain a temperature for each of the cells.

Abnormality detecting apparatus 8 includes a receiving circuit 32 receiving sensor information of voltage, current and temperature from transmitting circuit 30, CPU 34 obtaining the sensor information through receiving circuit 32, and ROM/RAM 36 that is a memory for storing a program executed on CPU 34 and/or to be a temporary workspace.

For example, as for a hybrid vehicle, battery 2 and state monitoring unit 6 are arranged in the rear part of the vehicle while abnormality detecting apparatus 8 is arranged in the front part of the vehicle, between which are connected by communication. It is noted that abnormality detecting apparatus 8 may be an ECU that provides control of the engine or the like, which is not shown.

Summarizing the above, power source apparatus 1 includes an assembled battery including a plurality of battery cells 14.0-14.m−1, a plurality of temperature sensors 12.0-12.m−1 respectively sensing the temperatures of the plurality of battery cells 14.0-14.m−1, a current sensor 16 sensing a current flowing through the assembled battery, and a state monitoring unit 6 and an abnormality detecting apparatus 8 that are a detecting unit detecting an abnormality of the plurality of temperature sensors 12.0-12.m−1.

The detecting unit detects an abnormality of the plurality of temperature sensors based on a first determination result of determining whether or not charging or discharging of the assembled battery is performed, a second determination result of determining a deviation (a difference between the maximum value and the minimum value) of the output values of the plurality of temperature sensors at a determination time point, and a third determination result of determining an output fluctuation range for each of the plurality of temperature sensors in a prescribed determination period.

The detecting unit periodically measures a current flowing through the assembled battery, determines sum of squares of measured values, divides the sum of squares of measured values by the number of measurement times to determine a mean square of current value, and determines whether or not charging or discharging of the assembled battery is performed using the mean square of current value.

The detecting unit makes a notification of an abnormality, when charging or discharging of the assembled battery is performed and on a basis of a plurality of detections of the deviation being greater than a prescribed first value and the output fluctuation range being smaller than a prescribed second value.

Figure 2:
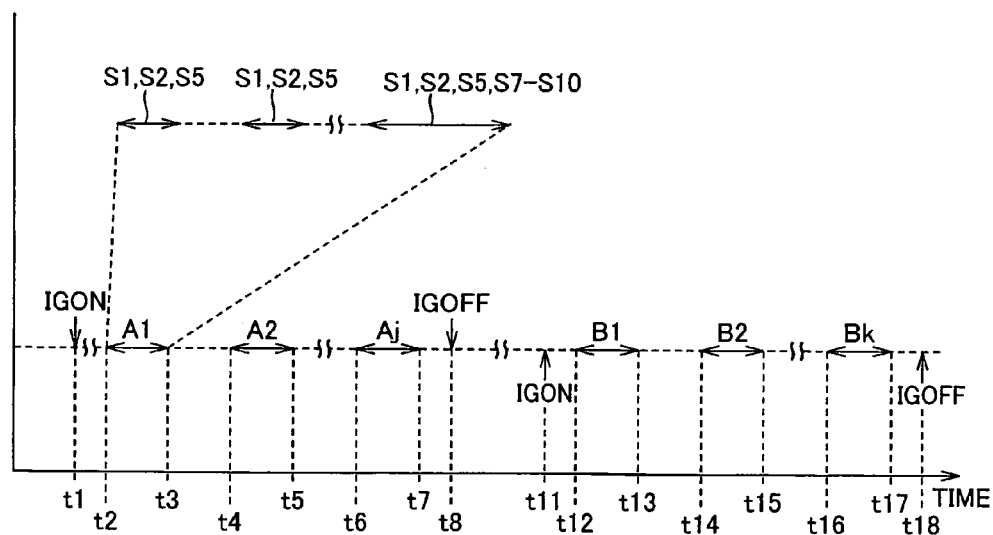
FIG. 2 is an explanatory view showing time points for performing an abnormality detection in the power supply apparatus of the present invention.

FIG. 2 is an explanatory view showing time points for performing an abnormality detection in the power supply apparatus of the present invention.

Referring to FIG. 2, at time point t1, an ignition switch is turned on, and at time point t8, the ignition switch is turned off. The period from time point t1 to time point t8 is referred to as one trip.

During this one trip, state monitoring unit 6 shown in FIG. 1 periodically performs state monitoring of temperature sensors 12.0-12.m−1. Specifically, the abnormality detection of the sensors is performed with prescribed time intervals, during a period A1 between time points t2 and t3, a period A2 between time points t4 and t5, . . . , and a period Aj between time points t6 and t7.

In period A1, steps S1, S2 and S5, which will be described later, are repeatedly performed with prescribed intervals, and finally in addition to steps S1, S2 and S5, steps S7-S10 are performed. As for periods A2-Aj also, steps similar to those for period A1 are performed.

In the next one trip, at time point t11, the ignition switch is turned on, and at time point t18, the ignition switch is turned off. During this one trip, state monitoring unit 6 shown in FIG. 1 periodically performs state monitoring of temperature sensors 12.0-12.m−1. Specifically, the abnormality detection of the sensors is performed with prescribed time intervals, during a period B1 between time points t12 and t13, a period B2 between time points t14 and t15, . . . , and a period Bk between time points t16 and t17. As for periods B1-Bk also, steps similar to those for period A1 are performed.

Figure 3:
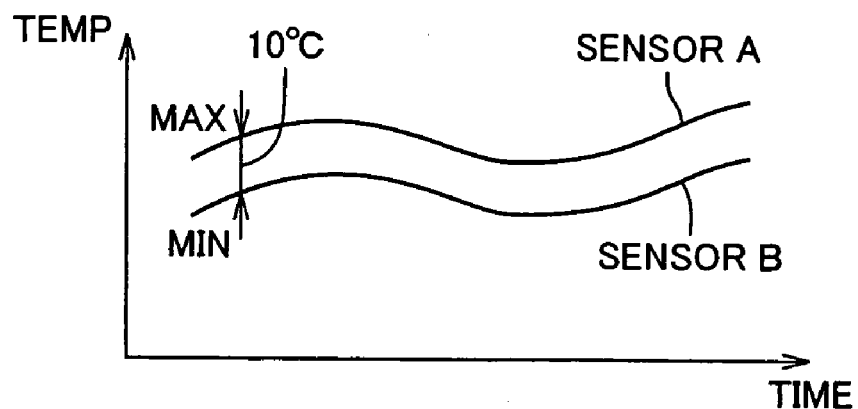
FIG. 3 shows a first example of measured temperatures when sensors are normal.

FIG. 3 shows a first example of measured temperatures when sensors are normal.

A plurality of temperature sensors are provided respectively corresponding to a plurality of cells of the assembled battery. In FIG. 3, among these sensors, the one with maximum measured temperature value is indicated as sensor A, while the one with the minimum measured temperature value is indicated as sensor B.

Depending on the position where the cells are provided, the cooling degree by the fan and the like, a certain temperature variation among the cells exists. On the other hand, the cells are serially connected as an assembled battery and charging and discharging is performed to the plurality of cells at once, and therefore sensors A and B show similar behavior over time, even if there is a certain temperature difference. Accordingly, it is normal if the difference between the maximum value and the minimum value among the measured values of the sensors is, for example, about 10° C. When the difference is excessively great, it is assumed that any sensor is abnormal and the normal temperature measurement is not performed.

Figure 4:
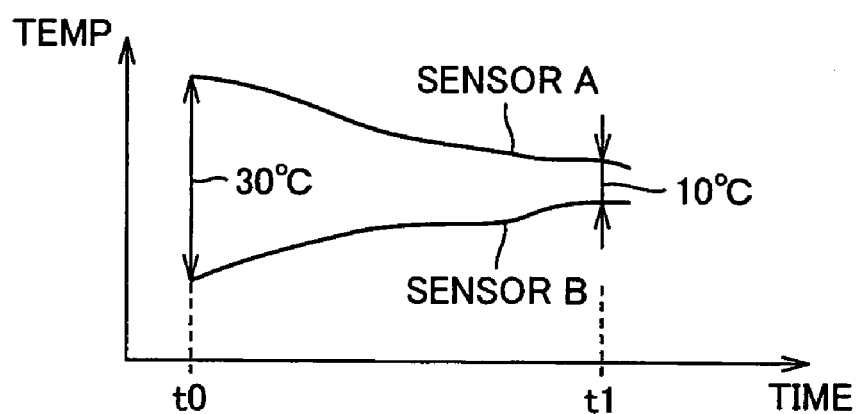
FIG. 4 shows a second example of progression of detected values when the sensors are normal.

FIG. 4 shows a second example of progression of detected values when the sensors are normal.

In FIG. 4, the temperature difference of 30° C. is present between sensor A with the maximum value and sensor B with the minimum value at the start up time point t0. For example, such a large temperature difference may suggest a case where the vehicle has been left in the full sunlight without cooling by the cooling fan, or where the vehicle had been traveling and the battery had been warmed up, and thereafter the engine was stopped and the vehicle has been left in the low temperatures.

However, when the engine is started and the vehicle is cause to travel, as the cells of the assembled battery are cooled by the fan or the like, the temperature variation among the cells gradually decreases, and it often becomes about 10° C. at time point t1, for example, similarly to the case shown in FIG. 3.

Figure 5:
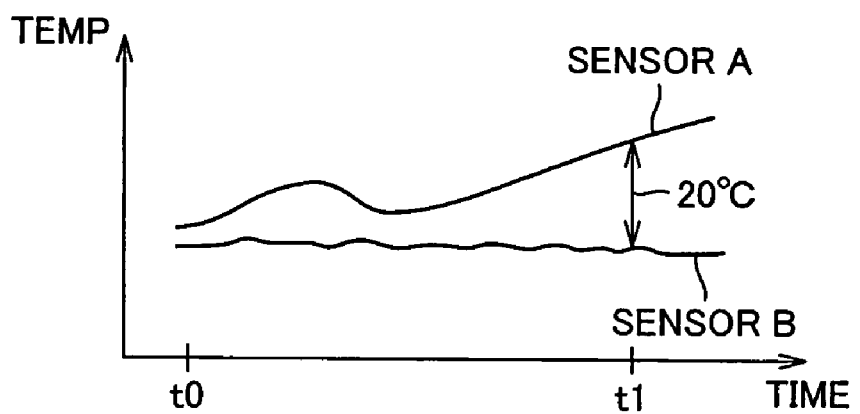
FIG. 5 shows an example of changes of the measured values over time when the sensors are abnormal.

FIG. 5 shows an example of changes of the measured values over time when the sensors are abnormal.

Referring to FIG. 5, sensor B is in a failure mode, consistently indicating substantially the same output values. The sensors each contain a resistor element of which resistance value changes in accordance with temperature. Based on the change in the resistance value, the temperature is detected. However, if the opposing ends of the resistor element are connected by, for example, another resistance substance, a change in the resistance value of the resistor element cannot be detected externally. Such a case is a failure in which output values are fixed, that is, a fixing abnormality.

Assume that, at time point t0, the ignition switch is turned on, charging/discharging of battery 2 is started, and the driving is continued until time point t1. Sensor A is normally operating, excellently detecting an increase in the temperature of the corresponding cell associated with charging/discharging. In contrast, sensor B is defective with its output values being fixed, and the value at time point t1 is substantially the same as at time point t0. When the difference between sensors A and B in the output values amounts to about 20° C. in such a case, it can be determined that there is an abnormality in the temperature sensor.

Such a method for detecting an abnormality of temperature sensors has been desired that the case shown in FIGS. 3 and 4 can be determined to be normal, while the case shown in FIG. 5 can be determined to be abnormal. If the determination is made simply based on the magnitude of the deviation of sensors A and B (the difference in the measured values between the sensor with the maximum value and the sensor with the minimum value), the case shown in FIG. 4 is erroneously detected as abnormal unless determination threshold value is set, for example, about 40° C. Still, the case shown in FIG. 5 cannot be detected.

Figure 6:
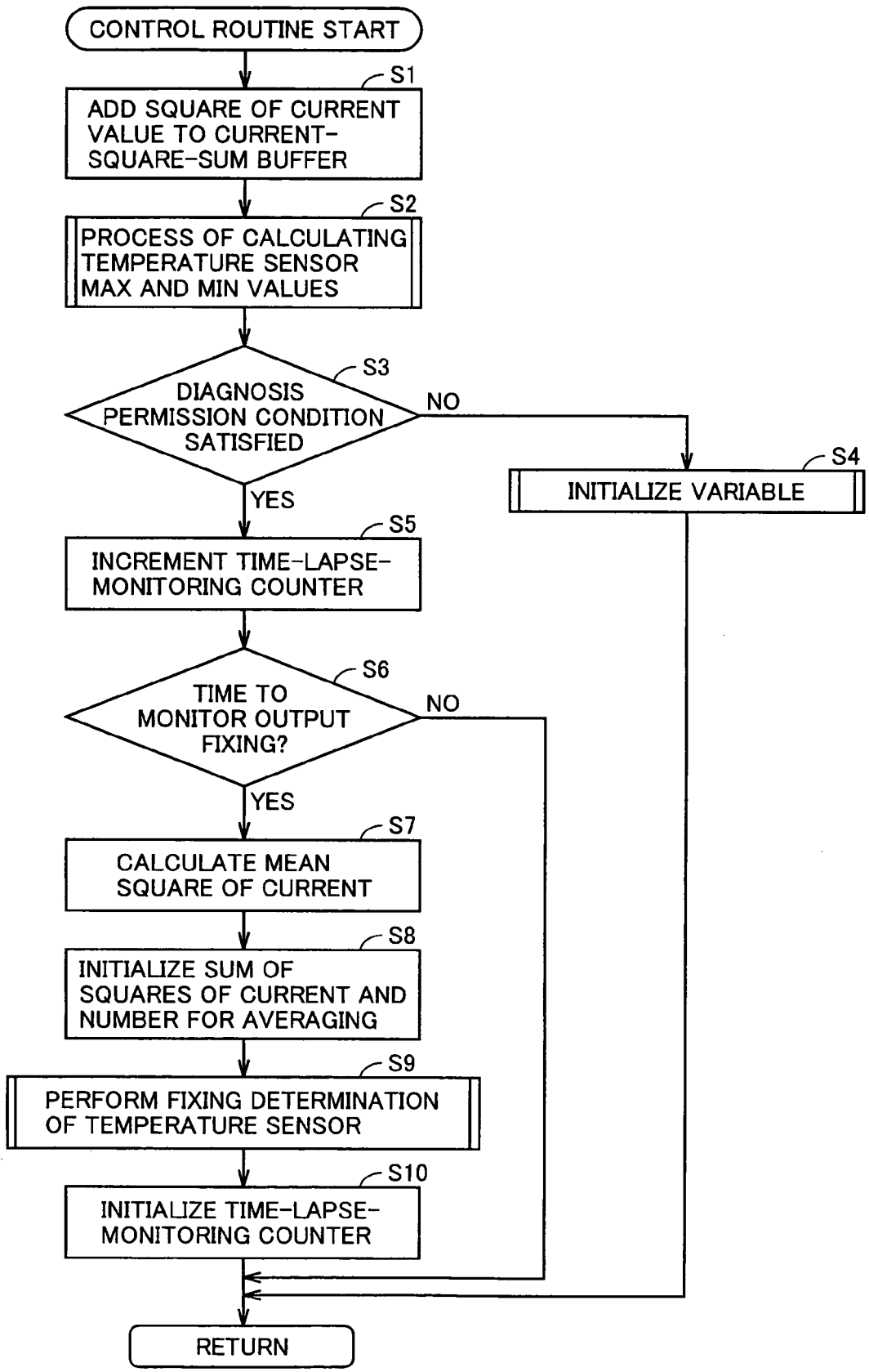
FIG. 6 is a flowchart for describing an operation of a method for detecting an abnormality of temperature sensors of the present invention.

FIG. 6 is a flowchart for describing an operation of a method for detecting an abnormality of the temperature sensors of the present invention.

CPU 34 shown in FIG. 1 periodically performs a control routine for abnormality detection shown in FIG. 6.

At step S1, squares of current values are added to a current-square-sum buffer. For example, CPU 34 obtains a current value measured at current sensor 16 through state monitoring unit 6 for every 100 msec, and squares the obtained value to add the squared value to the current-square-sum buffer. The current-square-sum buffer is stored in ROM/RAM 36 as a prescribed variable.

The sum of squares of current is employed so that the value of current, irrespective of the direction of flow, can be regarded as the load of battery 2. Specifically, though the direction of current flowing battery 2 is different between charging and discharging, it is expected that the measurement values of temperature sensors fluctuate as battery cells 14.0-14.m−1 generate heat in both cases of charging and discharging. Also, along with the addition of squares of current values, the number of addition times for calculating the mean square of current, which will be determined later, is incremented.

Subsequently, at step S2, a calculation process of the maximum and minimum values for each of temperature sensors 12.0-12.m−1 is performed. The process at step S2 will be described in detail later.

At step S3, whether or not a diagnosis permission condition is satisfied is determined. The diagnosis permission condition is satisfied when the following conditions are all met.

First, the power supply voltage supplied to abnormality detection apparatus 8 is normal; second, the power supply voltage supplied to state monitoring unit 6 is normal; third, CPU 26 of state monitoring unit 6 is capable of reading/writing from/to ROM/RAM 28 and performing transmission using transmitting circuit 30; fourth, current sensor 16 is normal and there is no disconnection, short-circuiting, characteristic mismatch or the like; and fifth, there is no disconnection, short-circuiting, characteristic mismatch or the like with temperature sensors 12.0-12.m−1.

At step S3, if the diagnosis permission condition is not satisfied, then the process goes to step S4 to initialize the variable, and exits the control routine.

On the other hand, at step S3, if the diagnosis permission condition is satisfied, then the process goes to step S5 to increment a time-lapse-monitoring counter implemented by a timer circuit included in CPU 34. Subsequently, at step S6, CPU34 refers to the time-lapse monitoring counter to determine whether or not it is the time to monitor the output fixing of the temperature sensors.

If it is not the time to monitor the output fixing yet, then the process exits the control routine. The above steps S1, S2 and S5 are repeated with prescribed intervals until the time to monitor the output fixing as shown in FIG. 2.

On the other hand, if it is determined that it is the time to monitor the output fixing at step S6, then the process goes to step S7 to calculate mean square of current. This case corresponds to the last portion of period A1 shown in FIG. 2.

Mean square of current is determined by dividing the sum of squares of current, having been added at step S1, by the number of addition times. Then, when the mean square of current is calculated at step S7, subsequently at step S8, the sum of squares of current and the number for averaging having been stored in ROM/RAM 36 at step S8 are initialized.

In such a way, calculating the mean square of current and thereafter immediately initializing the sum of squares of current and the number for averaging, an error in subsequent calculation of another mean square of current, i.e., a program bug, is less likely to occur.

Subsequently to step S8, the process goes to step S9 to determine whether or not the output fixing of temperature sensors 12.0-12.m−1 is present. The process at step S9 will be described in detail later.

Subsequently to step S9, the process goes to step S10 to initialize the time-lapse-monitoring counter.

While in FIG. 6 only the case where steps S1 and S2 are performed for the same number of times is exemplary shown, the change in the temperature is not that abrupt as compared to that in the current. Accordingly, for example step S1 may be performed for each 100 msec, while the step S2 may be performed for each 1 sec in order to alleviate the processing burden of CPU 34. In this case, FIG. 2 is modified so that step S2 is performed once when step S1 is performed ten times.

In such a case also, the output fixing monitoring time at step S6 is set to a time greater than 1 sec. FIG. 2 shows a case where the time points immediately before time points t3, t5, t7, t13, t15, and t17 correspond to the time to monitor output fixing, and steps S7-S10 are performed. Time points t3, t5, t7, t13, t15, and t17 correspond to the timing where the fixing determination of the temperature sensors ends and the time-lapse-monitoring counter is initialized at step S10.

Figure 7:
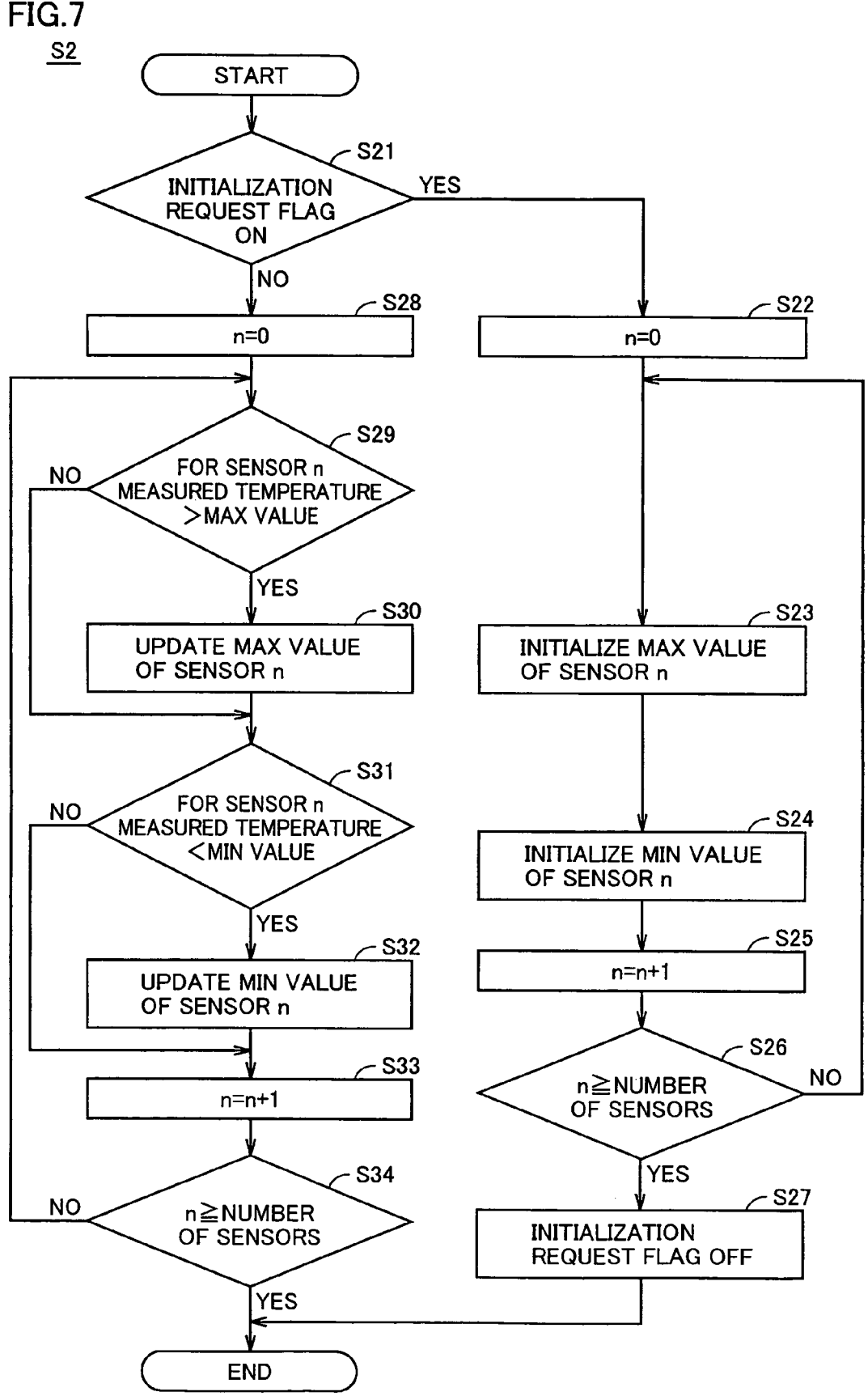
FIG. 7 is a flowchart for describing in detail the process of step S2 in FIG. 6.

FIG. 7 is a flowchart for describing the process at step S2 in FIG. 6 in detail.

Referring to FIG. 7, at step S21, whether or not an initialization request flag is on is determined.

At step S21, if the initialization request flag is on, then the process goes to step S22, and thereafter the maximum value (MAX value) and the minimum value (MIN value) of each temperature sensor are initialized.

Specifically, at step S22 variable n is set to 0, and subsequently at step S23, the maximum value of the measured value of sensor n stored as a variable in ROM/RAM 36 is initialized. Similarly, at step S24, the minimum value of sensor n also stored as a variable in ROM/RAM 36 is initialized. At step S25, variable n is incremented. Subsequently, at step S26, whether or not variable n is at least the number of sensors is determined.

If the condition is not satisfied at step S26, then the process goes to step S23 again in order to initialize the maximum and minimum values of the remaining sensors.

On the other hand, if the condition is satisfied at step S26, that is, the initialization of maximum and minimum values for all temperature sensors is finished, then at step S27 the initialization request flag is set to be off and the process at step S2 ends.

At step S21, if the initialization request flag is not on, then the process goes to step S28 to thereafter update the maximum and minimum values for sensor n.

First, at step S28, variable n is set to 0. Then at step S29, whether or not a condition of measured temperature>MAX value for sensor n is satisfied is determined. If the condition is satisfied at step S29, then the process goes to step S30 to update MAX value of sensor n to the last measured temperature.

When step S30 ends, the process goes to step S31. On the other hand, if the condition is not satisfied at step S29, then the process directly goes to step S31 skipping the step S30.

At step S31, whether or not a condition of measured temperature<MIN value for sensor n is satisfied is determined. If the condition is satisfied at step S31, then the process goes to step S32 to update MIN value of sensor n to the last measured temperature. Then, the process goes to step S33.

On the other hand, if the condition is not satisfied at step S31, the process directly goes to step S33 skipping step S32.

At step S33, variable n is incremented. Then the process goes to step S34 to determine whether or not variable n is at least the number of sensors. If the condition is not satisfied at step S34, then the process goes to step S29 again in order to update MAX and MIN values for the remaining sensors.

On the other hand, if the condition is satisfied at step S34, the process at step S2 ends.

Figure 8:
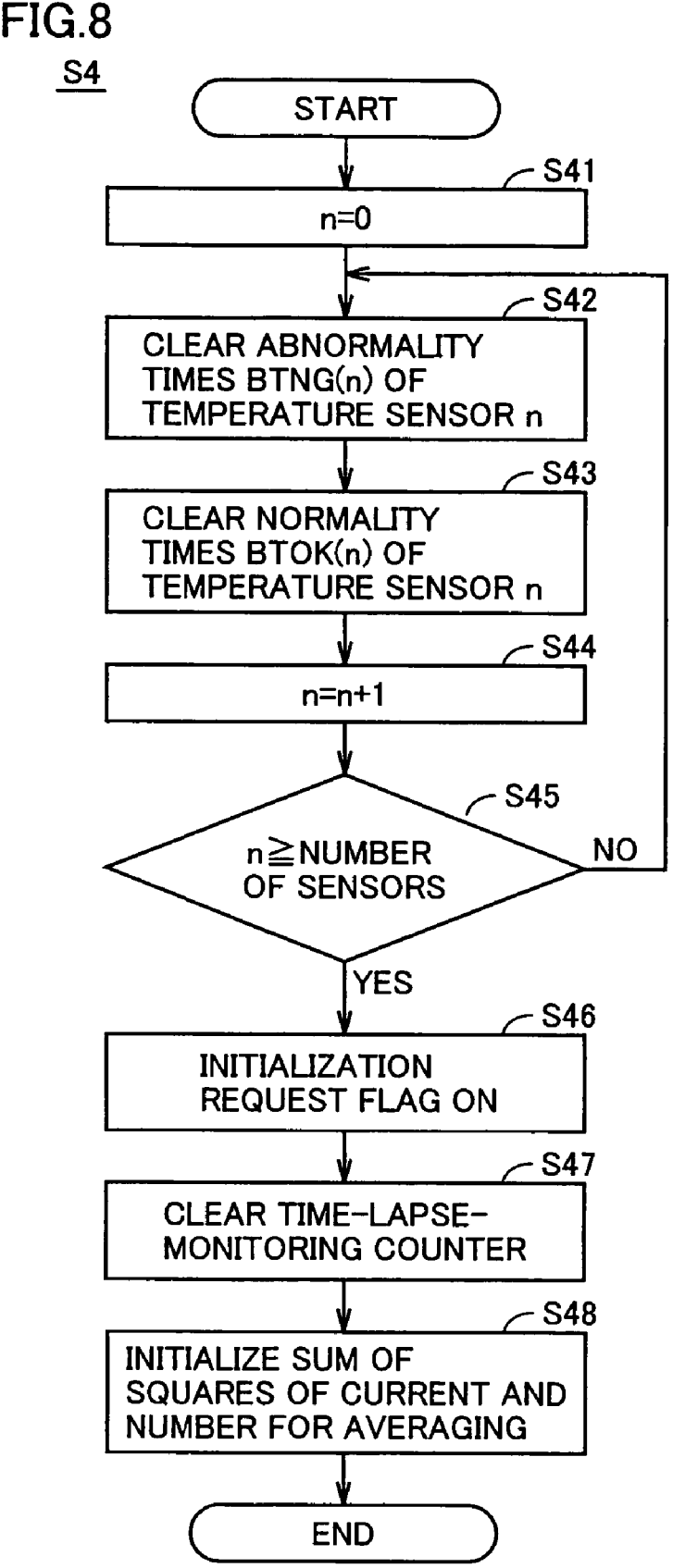
FIG. 8 is a flowchart showing in detail the process of step S4 in FIG. 6.

FIG. 8 is a flowchart showing the process at step S4 in FIG. 6 in detail.

Referring to FIG. 8, first, variable n is set to 0 at step S41. Subsequently, the process goes to step S42 to clear variable BTNG(n) indicative of the number of times that temperature sensor n was determined to be abnormal. Subsequently, the process goes to step S43 to clear variable BTOK(n) indicative of the number of times that temperature sensor n was determined to be normal. Then the process goes to step S44 to increment variable n.

Such variables BTNG(n) and BTOK(n) are stored in ROM/RAM 36 shown in FIG. 1. These variables are used to determine whether or not the state of temperature sensors is of a temporary nature in order to improve the accuracy of the abnormality detection.

Subsequently at step S45, whether or not variable n is at least the number of sensors is determined. If variable n is not at least the number of sensors, then the process goes to step S42 again to clear the number of times that the remaining temperature sensors were determined to be abnormal/normal.

On the other hand, if variable n is determined to be at least the number of sensors at step S45, then the process goes to step S46 to set the initialization request flag on. The initialization request flag is referred at step S21 in FIG. 7, and when it is on, MAX and MIN values of each temperature sensor having been stored in ROM/RAM 36 are initialized.

Subsequently, at step S47, the time-lapse-monitoring counter is cleared. Then at step S48, the sum of squares of current and the number for averaging are cleared, and the process at step S4 ends.

Figure 9:
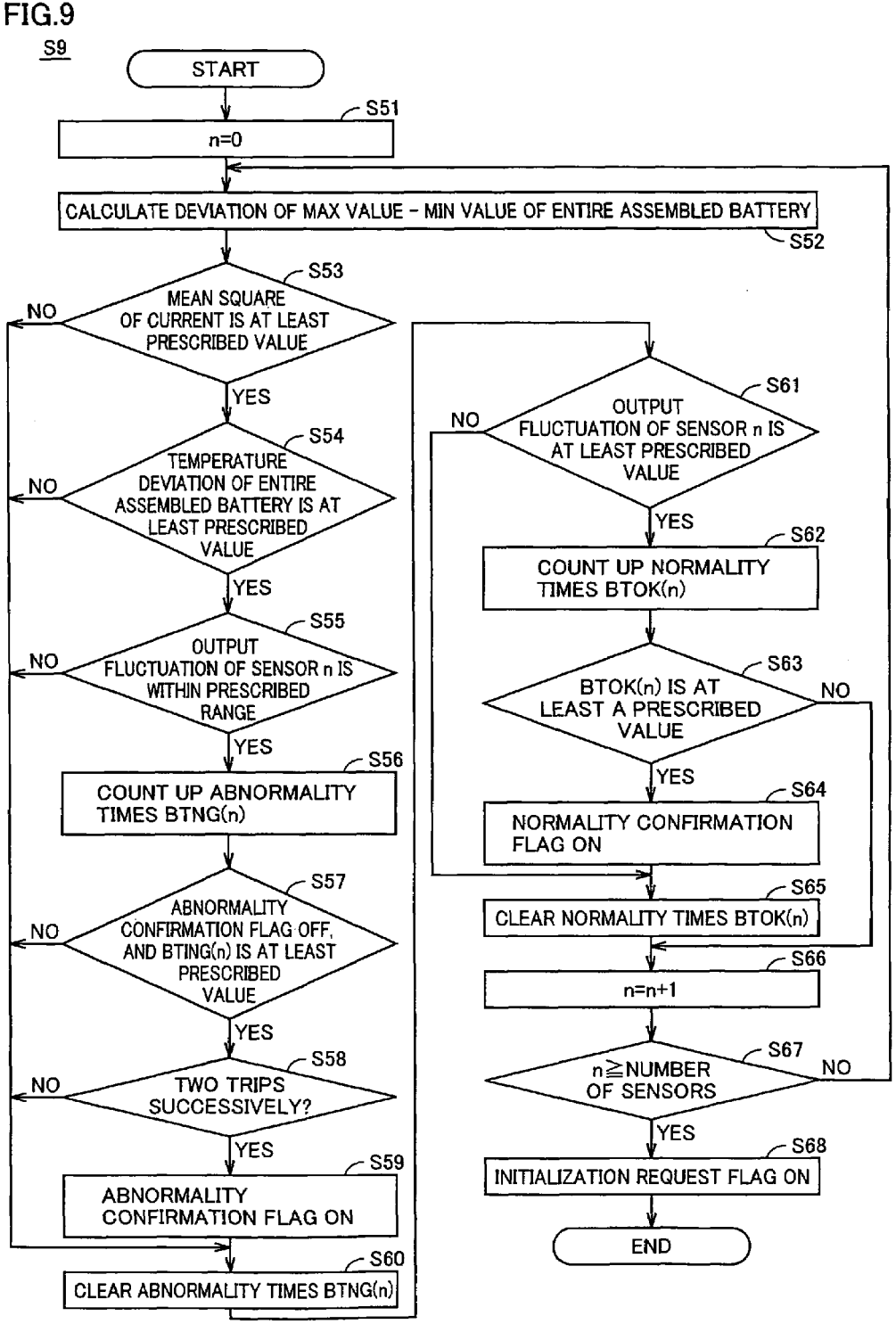
FIG. 9 is a flowchart showing in detail step S9 in FIG. 6 for performing a fixing determination of a temperature sensor in FIG. 6.

FIG. 9 is a flowchart showing in detail step S9 for performing the fixing determination of the temperature sensors shown in FIG. 6.

Referring to FIG. 9, when the process is started, first at step S51 variable n is set to 0. Then at step S52, the deviation of the maximum value and the minimum value of the measured values of the entire battery 2 is calculated. That is, out of the measured values of temperature sensors 12.0-12.m−1, the value obtained by subtracting the measured value indicative of the minimum value at this time point from the measured value indicative of the maximum value at this time point is derived as the deviation.

When step S52 ends, subsequently at step S53, whether or not the mean square of current having been determined at step S7 in FIG. 6 is at least a prescribed value is determined. Based on the fact that the mean square of current is at least a prescribed value, it is assumed that charging/discharging to/from battery 2 is performed, providing a load to battery 2, and therefore battery 2 is generating heat. When battery 2 is generating heat, these measured values must change if temperature sensors 12.0-12.m−1 are normal.

If it is determined that the mean square of current is at least a prescribed value at step 53, subsequently the process goes to step S54, and whether or not the temperature deviation of the entire assembled battery having been determined at step S52 is at least a prescribed value is determined.

The case where the temperature deviation being at least a prescribed value corresponds to the case indicated at time point t1 in FIG. 5, for example. Here, the normal sensor A indicates an increase in the measured temperature, while the abnormal sensor B does not indicate any change in the temperature. In such a case, the deviation increases, whereby the condition at step S54 is satisfied.

If the condition at step S54 is satisfied, then the process goes to step S55 to determine whether or not the output fluctuation of sensor n is within a prescribed range. The sensor such as sensor B shown in FIG. 5, which does not show much change in the measured temperature even when charging/discharging to/from the battery is performed, satisfies the condition at step S55.

If the condition at step S55 is satisfied, then the process goes to step S56 to count up variable BTNG(n) indicative of the number of times of abnormality detection for sensor n. This is because a determination based on a short period of time may result in an erroneous determination and therefore monitoring for a certain long period of time is necessary.

It should be noted that the determination sequence of steps S53-55 may be arranged differently, and it is not necessarily to be the sequence shown in FIG. 9.

Subsequently, when step S56 ends, the process goes to step S57. At step S57, whether or not an abnormality confirmation flag is off and variable BTNG(n) is at least a prescribed value is determined.

Satisfaction of the condition at step S57 means a determination of the occurrence of an abnormality in one trip. If the condition at step S57 is satisfied, then the process goes to step S58 to determine whether or not the abnormality is detected for two trips successively. If the condition at step S58 is satisfied, then the process goes to step S59 and the abnormality confirmation flag is set to be on. An abnormality detection for one trip is a tentative abnormality, and when an abnormality is detected also in the second trip, the abnormality is confirmed. Thus, the reliability of the abnormality detection is improved.

Then, an operator or a checker is notified of the occurrence of fixing abnormality in the temperature sensor, through lighting of an alert lamp or the like. When step S59 ends, the process goes to step S60.

On the other hand, if any of the conditions at steps S53, S54 and S55 is not satisfied, or if the conditions of steps S57 and S58 are not satisfied, the process directly goes to step S60.

At step S60, variable BTNG(n) indicative of the number of times of abnormality detection for sensor n is cleared. Then, the process goes to steps for determining whether or not sensor n is normal.

First, at step S61, whether or not the output fluctuation of sensor n is at least a prescribed value is determined. The output fluctuation of sensor n being at least a prescribed value means that the output value of the temperature sensor is changed in accordance with charging/discharging, and therefore the fixing abnormality is not occurring with sensor n. Accordingly, the process goes to step S62 to count up variable BTOK(n) indicative of the number of times of normality detection for sensor n. When step S62 ends, the process goes to step S63 to determine whether or not variable BTOK(n) is at least a prescribed value.

If the condition at step S63 is satisfied, then the process goes to step S64 to set a normality confirmation flag on for sensor n. When step S64 ends, the process goes to step S65.

On the other hand, if the output fluctuation of sensor n is less than a prescribed value, then the process directly goes to step S65. At step S65, variable BTOK(n) indicative of the number of times of normality detection for sensor n is cleared, and subsequently the process goes to step S66.

If it is determined that variable BTOK(n) is not at least a prescribed value at step S63, then the process directly goes to step S66.

At step S66, variable n is incremented. Then at step S67, whether or not variable n is at least the number of sensors is determined.

If it is determined that variable n is not at least the number of sensors, then the process goes to step S52 again to perform fixing determination for the remaining temperature sensors.

On the other hand, if it is determined that variable n is at least the number of sensors, then the process goes to step S68, the initialization request flag is set to be on, and the step S9 ends.

As described above, according to the present invention, the fixing abnormality can be detected accurately when a plurality of temperature sensors are used for monitoring the battery.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for detecting an abnormality of a plurality of temperature sensors provided to an assembled battery including a plurality of cells, comprising:
   a first step of determining whether or not charging or discharging of said assembled battery is performed;
   a second step of determining a deviation of output values of said plurality of temperature sensors at a determination time point;
   a third step of determining an output fluctuation range for each of said plurality of temperature sensors in a prescribed determination period;
   a fourth step of determining whether the output fluctuation range for a temperature sensor indicates that the output value of the temperature sensor is changed in accordance with the charging or discharging; and
   a fifth step of determining an abnormality if the deviation of the output value of the temperature sensor fails to change in accordance with the charging or discharging.

2. The method for detecting an abnormality according to claim 1, wherein said first step includes:
   a step of periodically measuring a current flowing through said assembled battery and determining sum of squares of measured values;

a step of dividing said sum of squares of measured values by number of measurement times to determine a mean square of current value; and a step of determining whether or not charging or discharging of said assembled battery is performed using said mean square of current value.

3. The method for detecting an abnormality according to claim 1, further comprising a step of making a notification of an abnormality, when charging or discharging of said assembled battery is performed and on a basis of a plurality of detections of said deviation being greater than a first value and said output fluctuation range being smaller than a second value.

4. A power supply apparatus, comprising:

an assembled battery including a plurality of cells;

a plurality of temperature sensors sensing temperatures of said plurality of cells, respectively;

a current sensor sensing a current flowing through said assembled battery; and a detecting unit detecting an abnormality of said plurality of temperature sensors; wherein said detecting unit detects the abnormality of said plurality of temperature sensors based on a first determination result of determining whether or not charging or discharging of said assembled battery is performed, a second determination result of determining a deviation of output values of said plurality of temperature sensors at a determination time point, a third determination result of determining an output fluctuation range for each of said plurality of temperature sensors in a prescribed determination period, a fourth determination result of whether the output fluctuation range for a temperature sensor indicates that the output value of the temperature sensor is changed in accordance with the charging or discharging; and a fifth determination result of an abnormality if the deviation of the output value of the temperature sensor fails to change in accordance with the charging or discharging.

5. The power supply apparatus according to claim 4, wherein said detecting unit periodically measures a current flowing through said assembled battery, determines sum of squares of measured values, divides said sum of squares of measured values by number of measurement times to determine a mean square of current value, and determines whether or not charging or discharging of said assembled battery is performed using said mean square of current value.

6. The power supply apparatus according to claim 4, wherein said detecting unit makes a notification of an abnormality, when charging or discharging of said assembled battery is performed and on a basis of a plurality of detections of said deviation being greater than a first value and said output fluctuation range being smaller than a second value.

* * * * *